United States Patent (10) Patent No.: US 9,067,191 B2
Seki et al. (45) Date of Patent: *Jun. 30, 2015

(54) HYDRODESULFURIZATION CATALYST FOR HYDROCARBON OIL, PROCESS OF PRODUCING SAME AND METHOD FOR HYDROREFINING

(75) Inventors: Hiroyuki Seki, Tokyo (JP); Yoshiaki Fukui, Tokyo (JP); Masanori Yoshida, Tokyo (JP); Shogo Tagawa, Kitakyushu (JP); Tomoyasu Kagawa, Kitakyushu (JP)

(73) Assignees: JX Nippon Oil & Energy Corporation, Tokyo (JP); JGC Catalysts and Chemicals Ltd., Kawasaki-shi, Kanagawa (JP)

( * ) Notice: Subject to any disclaimer, the term of this patent is extended or adjusted under 35 U.S.C. 154(b) by 240 days.

This patent is subject to a terminal disclaimer.

(21) Appl. No.: 13/498,165

(22) PCT Filed: Sep. 14, 2010

(86) PCT No.: PCT/JP2010/065785
§ 371 (c)(1),
(2), (4) Date: Mar. 26, 2012

(87) PCT Pub. No.: WO2011/040224
PCT Pub. Date: Apr. 7, 2011

(65) Prior Publication Data
US 2012/0181219 A1 Jul. 19, 2012

(30) Foreign Application Priority Data

Sep. 30, 2009 (JP) ................................. 2009-227464
Sep. 30, 2009 (JP) ................................. 2009-227465

(51) Int. Cl.
*B01J 21/06* (2006.01)
*B01J 21/12* (2006.01)
*C10G 45/06* (2006.01)
*C10G 45/08* (2006.01)
*B01J 21/08* (2006.01)
*B01J 23/24* (2006.01)
*B01J 23/74* (2006.01)
*B01J 23/85* (2006.01)
*B01J 23/882* (2006.01)
*B01J 23/883* (2006.01)
*B01J 35/00* (2006.01)
*B01J 35/10* (2006.01)
(Continued)

(52) U.S. Cl.
CPC ............... *B01J 21/063* (2013.01); *C10G 45/06* (2013.01); *C10G 45/08* (2013.01); *C10G 2300/1059* (2013.01); *C10G 2300/70* (2013.01); *B01J 21/08* (2013.01); *B01J 21/12* (2013.01); *B01J 23/24* (2013.01); *B01J 23/74* (2013.01); *B01J 23/85* (2013.01); *B01J 23/882* (2013.01); *B01J 23/883* (2013.01); *B01J 35/002* (2013.01); *B01J 35/1019* (2013.01); *B01J 35/1038* (2013.01); *B01J 35/1061* (2013.01); *B01J 35/108* (2013.01); *B01J 37/28* (2013.01); *C10G 45/04* (2013.01); *C10G 2300/4018* (2013.01); *C10G 2300/1074* (2013.01); *C10G 2300/202* (2013.01); *C10G 2300/301* (2013.01)

(58) Field of Classification Search
CPC ......... C10G 45/06; C10G 45/08; B01J 21/08; B01J 21/12; B01J 21/063; B01J 37/04; B01J 37/0201
USPC .................. 502/242, 254, 255, 258–260, 263; 208/213, 216 R, 216 PP, 217
See application file for complete search history.

(56) References Cited

U.S. PATENT DOCUMENTS 4,196,101 A 4/1980 Wilson et al.
6,267,874 B1 * 7/2001 Iijima et al. .................... 208/217

(Continued)

FOREIGN PATENT DOCUMENTS

JP 54-104495 A 8/1979
JP 05-184921 A 7/1993

(Continued)

OTHER PUBLICATIONS

Int'l Search Report issued Oct. 12, 2010 in Int'l Application No. PCT/JP2010/065785.

(Continued)

*Primary Examiner* — Renee E Robinson
(74) *Attorney, Agent, or Firm* — Panitch Schwarze Belisario & Nadel LLP

(57) ABSTRACT

The present invention provides a hydrodesulfurization catalyst that exhibits a high desulfurization activity when used in hydrotreatment of hydrocarbon oil, in particular straight-run gas oil. The catalyst includes at least one type of metal component selected from Groups VIA and VIII in the periodic table, supported on a silica-titania-alumina support where the total of the diffraction peak area indicating the crystal structure of anatase titania (101) planes and the diffraction peak area indicating the crystal structure of rutile titania (110) planes is ¼ or less of the diffraction peak area indicating the aluminum crystal structure ascribed to γ-alumina (400) planes, as measured by X-ray diffraction analysis. The catalyst has (a) a specific surface area (SA) of 150 m²/g or greater, (b) a total pore volume (PVo) of 0.30 ml/g or greater, (c) an average pore diameter (PD) of 6 to 15 nm (60 to 150 Å), and (d) the ratio of the pore volume (PVp) of pores having diameters within ±30 percent of the average pore diameter (PD) being 70 percent or greater of the total pore volume (PVo).

9 Claims, 1 Drawing Sheet

(51) Int. Cl.
*C10G 45/04* (2006.01)
*B01J 37/28* (2006.01)

(56) References Cited

U.S. PATENT DOCUMENTS

| | | | |
|---|---|---|---|
| 6,383,975 B1 * | 5/2002 | Rocha et al. | 502/309 |
| 6,656,349 B1 | 12/2003 | Fujita et al. | |
| 2003/0173256 A1 | 9/2003 | Fujikawa et al. | |
| 2006/0249429 A1 * | 11/2006 | Iki et al. | 208/209 |
| 2008/0017551 A1 | 1/2008 | Kiriyama et al. | |
| 2008/0280754 A1 | 11/2008 | Toledo et al. | |
| 2013/0153467 A1 | 6/2013 | Seki et al. | |

FOREIGN PATENT DOCUMENTS

| | | |
|---|---|---|
| JP | 10-118495 A | 5/1998 |
| JP | 11-319554 A | 11/1999 |
| JP | 2003-299960 A | 10/2003 |
| JP | 2005-254141 A | 9/2005 |
| JP | 2005-262063 A | 9/2005 |
| JP | 2005-262173 A | 9/2005 |
| JP | 2005-336053 A | 12/2005 |
| JP | 2008-239484 A | 10/2008 |
| JP | 2009-101362 A | 5/2009 |

OTHER PUBLICATIONS

Koshika et al, "Keiyu CHoshindo Datsuryu Shokubai no Kaihatsu-Dai San Seibun Tenka Koka-", Idemitsu Giho, vol. 47, No. 3, pp. 301-307 (2004).
Gardner et al, "Performance of titania-supported nimo catalyst coatings on alumina extrudates for advanced hydroprocessing applications", Petroleum Chemistry Division Preprints, vol. 47, No. 1, pp. 73-76 (2002).
Int'l Search Report issued Aug. 30, 2011 in Int'l Application No. PCT/JP2011/064106.
Extended European Search Report issued May 13, 2014 in EP Application No. 11798112.6.
Office Action issued Oct. 16, 2014 in U.S. Appl. No. 13/805,739.
Gates et al, "Chemistry of Catalytic Processes," McGraw-Hill, p. 250 (1979).

* cited by examiner

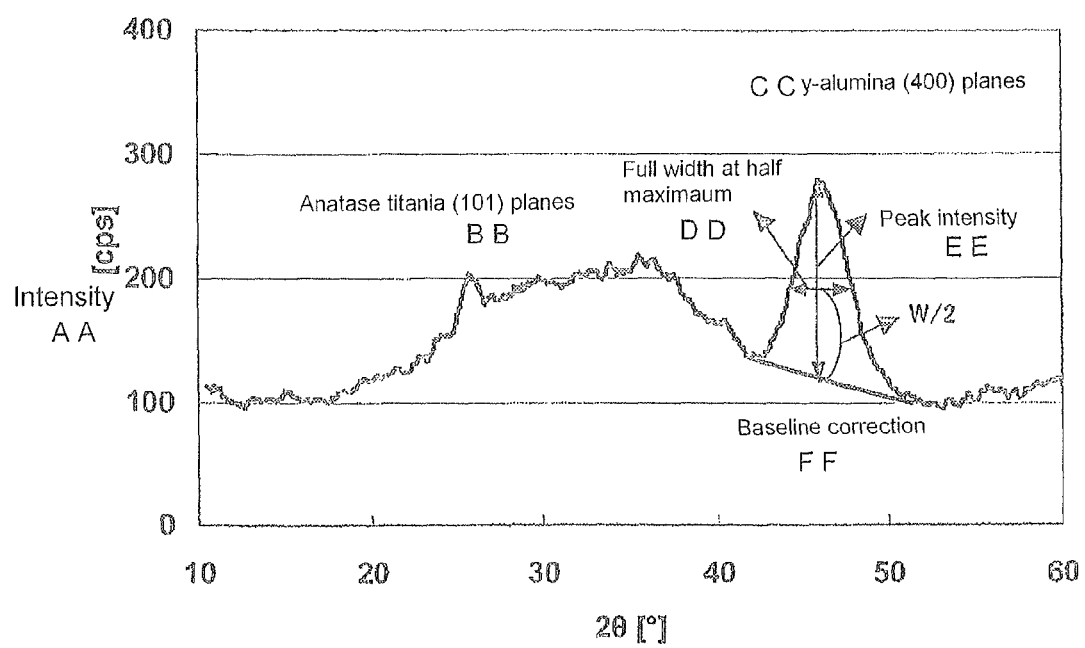

HYDRODESULFURIZATION CATALYST FOR HYDROCARBON OIL, PROCESS OF PRODUCING SAME AND METHOD FOR HYDROREFINING

CROSS-REFERENCE TO RELATED APPLICATION

This application is a Section 371 of International Application No. PCT/JP2010/065785, filed Sep. 14, 2010, which was published in the Japanese language on Apr. 7, 2011, under International Publication No. WO 2011/040224 A1, and the disclosure of which is incorporated herein by reference.

TECHNICAL FIELD

The present invention relates to a hydrodesulfurization catalyst for hydrocarbon oil, a process of producing the catalyst, and a method for hydrorefining hydrocarbon oils, more specifically to a hydrodesulfurization catalyst having a high desulfurization activity, comprising an active component supported on a silica-titania-alumina support, used for hydrotreating hydrocarbon oils in particular gas oil fractions, a process of producing such a catalyst, and a method for hydrorefining hydrocarbon oils using the catalyst.

BACKGROUND ART

Recently, a demand has been rapidly increased for a clean liquid fuel with a low sulfur content. In response to this demand, various methods for producing clean fuels have already been studied in the fuel oil industry. Due to a regulation requiring diesel fuel in particular to contain 10 ppm by mass or less of sulfur, petroleum companies have, therefore, created systems to produce a clean fuel with improved catalysts or installation of more facilities.

The main base oil of diesel fuel is generally a gas oil fraction distilling from an atmospheric distillation tower or a cracker. Production of a low sulfur content clean diesel fuel thus requires the sulfur to be removed with a hydrorefining unit.

Typically, gas oil is hydrorefined in a hydrogen flow in a fixed-bed reactor filled with a desulfurization catalyst under high temperature and pressure conditions.

Conventionally, a catalyst comprising an active metal component selected from Groups VIA and VIII in the periodic table supported on a support of a porous inorganic oxide such as alumina, alumina-silica, titania, or alumina-titania has been widely used as a catalyst used for the purpose of hydrotreating a hydrocarbon oil.

The titania support is known to exhibit a higher desulfurization performance than the alumina support but has a problem that it has a small specific surface area and low thermal stability at elevated temperatures. A titania-containing catalyst is known to be produced by a process wherein a titania support is prepared using titania gel (see Patent Literature 1 below) or wherein an alumina-titania support is prepared by loading a water-soluble titania compound on an alumina support (see Patent Literature 2 below). The catalyst described in Patent Literature 1 contains a large amount of titania, which is expensive and increase the production cost and bulk density compared with a catalyst comprising a conventional alumina support. Since the catalyst described in Patent Literature 2 can support titania only in an amount corresponding the water absorption rate of titania, it is expensive to be produced industrially because loading step is necessarily repeated so as to load titania in a large amount on a support. A method has been proposed wherein titania is mixed and highly dispersed in alumina upon preparation of thereof (see Patent Literature 3). This method enables titania to be highly dispersed in alumina but has disadvantages that as the content of titania increases, crystallization thereof is likely to accelerate, resulting in a catalyst with a decreased specific surface area and a deteriorated sharpness of the pore distribution. Furthermore, the catalyst is not a catalyst having sufficient properties that can cope with a regulation of 10 ppm sulfur content.

As described above, an improvement in a desulfurization catalyst has been vigorously carried out to produce a clean fuel. Despite of research and development for a long period of time, a catalyst technology satisfying a higher desulfurization activity has not been achieved yet. It may be because a plurality of desulfurization passages and active site structure effective therefor are not clear and variation in support composition affects differently desulfurization activity.

CITATION LIST

Patent Literature

Patent Literature 1: Japanese Patent Laid-Open Publication No. 2005-336053
Patent Literature 2: Japanese Patent Laid-Open Publication No. 2005-262173
Patent Literature 1: Japanese Patent Laid-Open Publication No. 10-118495

SUMMARY OF INVENTION

Technical Problem

The present invention has an object to provide an inexpensive and high-performance hydrodesulfurization catalyst comprising a support containing mainly alumina, and silica and titania, with a high specific surface area and a process of producing such a catalyst as well as a method for hydrorefining a hydrocarbon oil using the hydrodesulfurization catalyst.

Solution to Problem

As the results of extensive study and research, the present invention was accomplished on the basis of the finding that a hydrodesulfurization catalyst comprising a silica-titania-alumina support having a specific structure, and having specific properties was significantly improved in desulfurization performance for a hydrocarbon oil.

That is, the present invention relates to a hydrodesulfurization catalyst for a hydrocarbon oil comprising at least one type of metal component selected from Groups VIA and VIII in the periodic table, supported on a silica-titania-alumina support where the total of the diffraction peak area indicating the crystal structure of anatase titania (101) planes and the diffraction peak area indicating the crystal structure of rutile titania (110) planes is ¼ or less of the diffraction peak area indicating the aluminum crystal structure ascribed to γ-alumina (400) planes, as measured by X-ray diffraction analysis, the catalyst having (a) a specific surface area (SA) of 150 m$^2$/g or greater, (b) a total pore volume (PVo) of 0.30 ml/g or greater, (c) an average pore diameter (PD) of 6 to 15 nm (60 to 150 Å), and (d) the ratio of the pore volume (PVp) of pores having diameters within ±30 percent of the average pore diameter (PD) being 70 percent or greater of the total pore volume (PVo).

The present invention also relates to a process of producing the foregoing catalyst comprising:

a first step of producing a hydrate by mixing a basic aluminum salt aqueous solution and a mixed aqueous solution of a titanium mineral acid salt and an acidic aluminum salt such that the pH is form 6.5 to 9.5;

a second step of producing a support by in turn washing, extruding, drying and calcining the hydrate; and a third step of loading at least one type of metal component selected from Groups VIA and VIII in the periodic table, on the support.

The present invention also relates to a method for hydrorefining a hydrocarbon oil, comprising hydrotreating a hydrocarbon oil under a hydrogen atmosphere using the foregoing hydrodesulfurization catalyst.

Advantageous Effects of Invention

The catalyst of the present invention is extremely advantageous because it exhibits a high desulfurization activity in hydrotreatment of a hydrocarbon oil, in particular gas oil fraction. The process of producing a catalyst according to the present invention can highly disperse titanium in a support and thus can produce an inexpensive catalyst with high performances even with a small amount of titanium, which is more expensive than alumina and silica. The method for hydrotreating of the present invention can remove large amounts of sulfur and nitrogen from a hydrocarbon oil.

BRIEF DESCRIPTION OF DRAWING

FIG. 1 is a graph showing the X-ray diffraction analysis results of support a in Example 1.

DESCRIPTION OF EMBODIMENTS

The present invention will be described in detail below.

The catalyst of the present invention comprises at least one type of metal component selected from Groups VIA and VIII in the periodic table, supported on a silica-titania-alumina support where the total of the diffraction peak area indicating the crystal structure of anatase titania (101) planes and the diffraction peak area indicating the crystal structure of rutile titania (110) planes is ¼ or less of the diffraction peak area indicating the aluminum crystal structure ascribed to γ-alumina (400) planes, as measured by X-ray diffraction analysis, the catalyst having (a) a specific surface area (SA) of 150 m$^2$/g or greater, (b) a total pore volume (PVo) of 0.30 ml/g or greater, (c) an average pore diameter (PD) of 6 to 15 nm (60 to 150 Å), and (d) the ratio of the pore volume (PVp) of pores having diameters within ±30 percent of the average pore diameter (PD) being 70 percent or greater of the total pore volume (PVo).

The silica-titania-alumina support of the hydrodesulfurization catalyst of the present invention contains silica in the form of $SiO_2$ in an amount of preferably 1 to 10 percent by mass, more preferably 2 to 7 percent by mass, more preferably 2 to 5 percent by mass on the support basis. A silica content of less than one percent by mass decreases the specific surface areas of the resulting catalyst and causes titania particles to be likely to aggregate upon calcination of the support, resulting in larger diffraction peak areas indicating the crystal structures of anatase titania and rutile titania. A silica content of more than 10 percent by mass causes the resulting support to be poor in sharpness of the pore distribution and thus possibly to fail to obtain a desired desulfurization activity.

In the present invention, the silica-titania-alumina support contains titania in the form of $TiO_2$ in an amount of preferably 3 to 40 percent by mass, more preferably 15 to 35 percent by mass, more preferably 15 to 25 percent by mass on the basis of the weight of the support. A titania content of less than 3 percent by mass is too less in effect achieved by addition of titania, resulting in a catalyst that may not obtain a sufficient desulfurization activity. A titania content of more than 40 percent by mass is not preferable because not only the mechanical strength of the resulting catalyst is reduced but also the specific surface area is reduced due to the increased tendency for titania particles to accelerate in crystallization upon calcination of the support and thus the resulting catalyst may not exhibit a desulfurization performance corresponding to the economic efficiency according to the increased amount of titania, and may not be a catalyst, which is cheap and has high performances intended by the present invention.

The silica-titania-alumina support contains alumina in the form of $Al_2O_3$ in an amount of preferably 50 to 96 percent by mass, more preferably 58 to 83 percent by mass, more preferably 70 to 83 percent by mass on the basis of the weight of the support. An alumina content of less than 50 percent by mass is not preferable because the resulting catalyst tends to degrade significantly. An alumina content of more than 96 percent by mass is also not preferable because the catalyst performances tend to deteriorate.

The hydrodesulfurization catalyst of the present invention comprises one or more type of metal component selected from Group VIA (IUPAC Group 6) and Group VIII (IUPAC Groups 8 to 10) in the periodic table, supported on the above-described support.

Examples of metal components of Group VIA in the periodic table include molybdenum (Mo) and tungsten (W). Examples of metal components of Group VIII in the periodic table include cobalt (Co) and nickel (Ni). These metal components may be used alone or in combination. In view of catalyst performances, the metal components are preferably combinations such as nickel-molybdenum, cobalt-molybdenum, nickel-molybdenum-cobalt, nickel-tungsten, cobalt-tungsten, and nickel-tungsten-cobalt, more preferably combinations such as nickel-molybdenum, cobalt-molybdenum, and nickel-molybdenum-cobalt.

The metal component(s) are supported in the form of oxide in an amount of preferably 1 to 35 percent by mass, more preferably 15 to 30 percent by mass on the catalyst basis. The metal component of Group VIA in the periodic table is supported in the form of oxide in an amount of preferably 10 to 30 percent by mass, more preferably 13 to 24 percent by mass while the metal component of Group VIII in the periodic table is supported in the form of oxide in an amount of preferably 1 to 10 percent by mass, more preferably 2 to 6 percent by mass.

In the case where the hydrodesulfurization catalyst of the present invention contains a metal component of Group VIA in the periodic table, the metal component is preferably dissolved in acid. The acid is preferably an inorganic acid and/or an organic acid. Examples of the inorganic acid include phosphoric acid and nitric acid. More preferred is phosphoric acid. The organic acid is preferably a carboxylic acid. Examples of the carboxylic acid include citric acid, malic acid, tartaric acid, and gluconic acid.

In the case of using phosphoric acid, it is contained in an amount of preferably 3 to 25 percent by mass, more preferably 10 to 15 percent by mass on an oxide basis, of 100 percent by mass of the metal component of Group VIA in the periodic table. A content of more than 25 percent by mass is not preferable because catalyst performances would be poor. A content of less than 3 percent by mass is also not preferable because stability of the resulting metal component solution to be loaded would be deteriorated.

It the case of using an organic acid, it is contained in an amount of preferably 35 to 75 percent by mass, more preferably 55 to 65 percent by mass of the metal component of Group VIA in the periodic table. A content of more than 75 percent by mass is not preferable because a solution containing the metal component (hereinafter may be referred to as "metal-containing solution for loading") is increased in viscosity and thus renders it difficult to be impregnated during the process. A content of less than 35 percent by mass is also not preferable because the stability of the metal-containing solution for loading would be poor and catalyst performances tends to deteriorate.

No particular limitation is imposed on the method for including the above-described metal component or further an inorganic acid (phosphoric acid or the like) and/or an organic acid solution in the above-described support. Any conventional method may be used such as impregnation (equilibrium adsorption, pore-filling, incipient-wetness methods) and ion exchange method using a compound containing the metal component or further using an inorganic acid (phosphoric acid) and/or an organic acid. Impregnation used herein refers to a method wherein a support is impregnated with a solution of a metal component, dried and then calcined.

In impregnation, metal components of Groups VIA and VIII in the periodic tables are preferably loaded simultaneously. Separate loading of the metal components would result in insufficient desulfurization and denitrogenation activities. Loading by impregnation is carried out in the coexistence of acid, preferably an inorganic acid and/or an organic acid, more preferably phosphoric acid and/or an organic acid because the resulting catalyst will be enhanced in desulfurization and denitrogenation activities as the metal component of Group VIA in the periodic table is highly dispersed on the support. Thereupon, phosphoric acid and/or an organic acid are preferably added in an amount of 3 to 25 percent by mass (an oxide basis) and an amount of 35 to 75 percent by mass, respectively of 100 percent by mass of the metal component of Group VIA in the periodic table. Examples of the organic acid include carboxylic acid compounds, specifically citric acid, malic acid, tartaric acid, and gluconic acid.

The desulfurization catalyst of the present invention has necessarily a specific surface area (SA) of 150 $m^2/g$ or greater, preferably 170 $m^2/g$ or greater, as measured by BET method. A specific surface area (SA) of smaller than 150 $m^2/g$ is not preferable because the number of active site for desulfurization would be decreased. Whilst, no particular limitation is imposed on the upper limit. However, a specific surface area (SA) of greater than 250 $m^2/g$ would tend to decrease the catalyst strength and thus is preferably 250 $m^2/g$ or smaller, more preferably 230 $m^2/g$ or smaller.

The hydrodesulfurization catalyst of the present invention has necessarily a total pore volume (PVo) of 0.30 ml/g or greater, preferably 0.35 ml/g or greater, as measured by mercury intrusion technique (mercury contact angle: 135 degrees, surface tension: 480 dyn/cm). No particular limitation is imposed on the upper limit of the total pore volume, which is, however, preferably 0.60 ml/g or smaller, more preferably 0.50 ml/g or smaller because a total pore volume of greater than 0.60 ml/g would likely cause the resulting catalyst to be decreased in strength.

Furthermore, the hydrodesulfurization catalyst has necessarily an average pore diameter (PD) of 6 to 15 nm (60 to 150 Å), preferably 6.5 to 11 nm. A catalyst with an average pore diameter (PD) of less than 6 nm would have too small pores and thus be poor in reactivity with a feedstock while a catalyst with an average pore diameter of greater than 15 nm would be difficult to be produced and tend to be poor in catalyst performances because of its too small specific surface area. The total pore volume (PVo) refers to pores with a pore diameter of 4.1 nm (41 Å) or greater, which is the quantitative limit in measurement while the average pore diameter (PD) refers to a pore diameter corresponding to 50 percent of the total pore volume (PVo).

In the hydrodesulfurization catalyst, the ratio (PVp/PVo) of the pore volume of the pores having a pore diameter within ±30 percent of the average pore diameter (PVp) in the total pore diameter (PVo) is necessarily 70 percent or more, preferably 80 percent or more, and the pore distribution is sharp. When the PVp/PVo is less than 70 percent, the pore distribution is too broad and thus the resulting catalyst may not obtain a desired desulfurization performance.

For the support of the hydrodesulfurization catalyst of the present invention, the total of the diffraction peak area indicating the crystal structure of anatase titania (101) planes and the diffraction peak area indicating the crystal structure of rutile titania (110) planes (hereinafter also referred to as "titania diffraction peak area") is necessarily ¼ or less, preferably ⅕ or less, more preferably ⅙ or less of the diffraction peak area indicating the aluminum crystal structure ascribed to γ-alumina (400) planes, as measured by X-ray diffraction analysis. When the titania diffraction peak area to the alumina diffraction peak area (titania diffraction peak area/alumina diffraction peak area) is greater than ¼, crystallization of titania accelerates and thus the number of the pores effective for the reaction is decreased. Therefore, even if the amount of titania is increased, the resulting catalyst can not exhibit a desulfurization performance as balanced with the economy and fails to be an inexpensive catalyst with high performances intended by the present invention.

The diffraction peak indicating the crystal structure of anatase titania (101) planes is measured at 2θ=25.5° while the diffraction peak indicating the crystal structure of rutile titania (110) planes is measured at 2θ=27.5°. The diffraction peak indicating the aluminum crystal structure ascribed to γ-alumina (400) planes is measured at 2θ=45.9°.

Each of the diffraction peak areas is calculated by fitting a graph obtained through X-ray diffraction analysis with an X-ray diffraction device, with a least square method, followed by baseline correction, and finding the height (peak intensity W) from the maximum peak value to the baseline so as to derive the peak width (full width at half maximum) when the resulting peak strength is half (W/2) thereby defining the product of the full width at half maximum and peak intensity as a diffraction peak area. "Titania diffraction peak area/alumina diffraction peak area" is derived from each of the diffraction peak areas thus obtained.

A process of producing the hydrodesulfurization catalyst of the present invention will be described next.

The process of producing the hydrodesulfurization catalyst of the present invention comprises: a first step of producing a hydrate by mixing a mixed aqueous solution of a titanium mineral acid salt and an acidic aluminum salt (hereinafter simply referred to as "mixed aqueous solution") with a basic aluminum salt aqueous solution in the presence of silicate ion such that the pH is form 6.5 to 9.5; a second step of producing a support by in turn washing, extruding, drying and calcining the hydrate; and a third step of loading at least one type of metal component selected from Groups VIA (IUPAC Group 6) and VIII (IUPAC Groups 8 to 10) in the periodic table on the support. Each of the steps will be described below.

(First Step)

First of all, in the presence of silicate ion, a mixed solution of a titanium mineral acid salt and an acidic aluminum salt (this is an acidic aqueous solution) is mixed with a basic aluminum salt aqueous solution (this is an alkaline aqueous solution) such that the pH is form 6.5 to 9.5, preferably from 6.5 to 8.5, more preferably from 6.5 to 7.5 thereby producing a hydrate containing silica, titania and alumina.

In this step, there are two alternative cases (1) where a mixed aqueous solution is added to a basic aluminum salt aqueous solution containing silicate ion and (2) where a basic aluminum salt aqueous solution is added to a mixed solution containing silicate ion.

In case (1), silicate ion contained in a basic aluminum aqueous solution may be basic or neutral. Basic silicate ion sources may be silicic acid compounds such as sodium silicate, which can generate silicate ions in water. In case (2), silicate ion contained in a mixed aqueous solution of a titanium mineral acid salt and an acidic aluminum salt aqueous solution may be acidic or neutral. Acidic silicate sources may be silicic acid compounds such as silicic acid, which can generate silicate ions in water.

Examples of the basic aluminum salt include sodium aluminate and potassium aluminate. Examples of the acidic aluminum salt include aluminum sulfate, aluminum chloride, and aluminum nitrate. Examples of the titanium mineral acid salt include titanium tetrachloride, titanium trichloride, titanium sulfate, and titanium nitrate. In particular, titanium sulfate is preferably used because it is inexpensive.

For example, a predetermined amount of a basic aluminum salt aqueous solution containing basic silicate ion is charged into a tank with a stirrer and heated and maintained to a temperature of usually 40 to 90° C., preferably 50 to 70° C., and to the solution was continuously added a predetermined amount of a mixed aqueous solution of a titanium mineral acid salt and acidic aluminum salt aqueous solution heated to a temperature of ±5° C., preferably ±2° C., more preferably ±1° C. of the basic aluminum salt aqueous solution for usually from 5 to 20 minutes, preferably from 7 to 15 minutes so that the pH is from 6.5 to 9.5, preferably from 6.5 to 8.5, more preferably from 6.5 to 7.5 to produce a precipitate, which is a slurry of hydrate. It is noted that since addition of the basic aluminum salt aqueous solution to the mixed solution for a too long period of time would cause the production of crystals of pseudoboehmite, bayerite or gibbsite, which are not preferable, the addition is carried out for desirously 15 minutes or shorter, more desirously 13 minutes or shorter. Bayerite and gibbsite are not preferable because they reduce the specific surface area after calcination.

(Second Step)

The hydrate slurry produced in the first step is aged if necessary and then washed to remove the by-produced salts thereby producing a hydrate slurry containing silica, titania and alumina. The resulting hydrate slurry is further heated and aged if necessary and then formed into an extrudable kneaded product by a conventional method, such as heat-kneading. The extrudable product is extruded into a desired shape by extrusion and then dried at a temperature of 70 to 150° C., preferably 90 to 130° C. and calcined at a temperature of 400 to 800° C., preferably 450 to 600° C. for 0.5 to 10 hours, preferably 2 to 5 hours thereby producing a silica-titania-alumina support.

(Third Step)

On the resulting silica-titania-alumina support is loaded at least one type of metal component selected from Groups VIA and VII in the periodic table with a conventional manner (impregnation, immersion) as described above. The support with the metal component loaded thereon is then calcined at a temperature of usually 400 to 800° C., preferably 450 to 600° C. for 0.5 to 10 hours, preferably 2 to 5 hours thereby producing a hydrodesulfurization catalyst according to the present invention.

Raw materials of the metal component are preferably nickel nitrate, nickel carbonate, cobalt nitrate, cobalt carbonate, molybdenum trioxide, ammonium molybdate, and ammonium paratungsten.

Next, an explanation will be given of a method for hydrorefining a hydrocarbon oil according to the present invention.

In this method, a hydrocarbon oil is hydrotreated under hydrogen atmosphere and high temperature and pressure conditions using the above-described hydrodesulfurization catalyst, which is filled into a fixed-bed reactor.

Hydrocarbon oils used in the present invention are preferably gas oil fractions. Examples of the gas oil fractions include straight-run gas oil produced through an atmospheric distillation unit for crude oil; vacuum gas oil produced by distilling straight heavy oil or residue obtained from an atmospheric distillation unit, in a vacuum distillation unit; light cycle oil produced by fluid catalytic-cracking vacuum heavy gas oil or desulfurized heavy oil; hydrocracked gas oil produced by hydrocracking vacuum heavy gas oil or desulfurized heavy oil; and thermal-cracked gas oil obtained through a thermal cracking unit such as a coker, all of which are fractions containing 70 percent by volume or more of a fraction whose boiling point is from 260 to 360° C. No particular limitation is imposed on oils to be treated in an atmospheric distillation unit. Examples of such oils include petroleum crude oil, synthetic crude oil derived from oil sand, liquefied coal oil, and bitumen reformed oil.

The value of the distillation characteristics (boiling point) referred herein is measured in accordance with the method described in JIS K2254 "Petroleum products-Determination of distillation characteristics".

The method for hydrorefining a hydrocarbon oil according to the present invention is preferably carried out under the following reaction conditions.

No particular limitation is imposed on the reaction temperature, which is, however, preferably from 300 to 420° C., more preferably from 320 to 380° C. A reaction temperature of lower than 300° C. is not practical because desulfurization and denitrogenation activities tend to significantly deteriorate. A reaction temperature of higher than 420° C. is not preferable because the catalyst is drastically decomposed and the reaction temperature is close to the operating temperature limit (usually 425° C.) of the reactor.

No particular limitation is imposed on the reaction pressure (hydrogen partial pressure), which is, however, preferably from 3.0 to 15.0 MPa. At a reaction pressure of lower than 3.0 MPa, desulfurization and denitrogenation activities tend to significantly decrease. The reaction pressure is thus preferably 3.0 MPa or higher, more preferably 4.0 MPa or higher. A reaction pressure of higher than 15.0 MPa is not preferable because hydrogen consumption increases, resulting in a higher running cost. The reaction pressure is thus preferably 15.0 MPa or lower, more preferably 10.0 MPa or lower, more preferably 7.0 MPa or lower.

No particular limitation is imposed on the liquid hourly space velocity, which is, however, preferably from 0.5 to 4.0 $h^{-1}$, more preferably from 0.5 to 2.0 $h^{-1}$. A liquid hourly space velocity of less than 0.5 $h^{-3}$ is not practical because the productivity is reduced due to the reduced amount of throughput. A liquid hourly space velocity of greater than 4.0 is not preferable because the decomposition of the catalyst accelerates.

No particular limitation is imposed on the hydrogen/oil ratio, which is, however, is preferably from 120 to 420 NL/L, more preferably from 170 to 340 NL/L. A hydrogen/oil ratio of less than 120 NL/L is not preferable because the desulfurization rate decreases. A hydrogen/oil ratio of greater than 420 NL/L is not also preferable because it can not change the desulfurization activity and only increases the running cost.

The oil produced by hydrotreating of hydrocarbon oil according to the present invention has a sulfur content of preferably 10 ppm by mass or less, more preferably 8 ppm by mass or less, more preferably 7 ppm by mass or less. The oil has a nitrogen content of preferably 3 ppm by mass or less, more preferably one ppm by mass. The present invention can decrease significantly the sulfur and nitrogen contents of the produced oil by hydrotreating hydrocarbon oil using the above-described specific hydrodesulfurization catalyst.

The sulfur content (sulfur concentration) referred herein is measured in accordance with the method described in JIS K2541 "Determination of sulfur content". The nitrogen content (nitrogen concentration) referred herein is measured in accordance with the method described in JIS K2609 "Determination of nitrogen content".

EXAMPLES

The present invention will be described in more details with reference to the following examples but is not limited thereto.

[Preparation of Hydrodesulfurization Catalyst a]

Into a 100 L volume tank equipped with a steam jacket were put 8.16 kg of an aqueous solution containing sodium aluminate in an amount of 22 percent by mass on an $Al_2O_3$ concentration basis. The solution was diluted with 41 kg of ion-exchange water, to which 1.80 kg of a solution containing sodium silicate in an amount of 5 percent by mass on an $SiO_2$ concentration basis were then added, stirring. The resulting mixture was heated at a temperature of 60° C. thereby preparing a basic aluminum salt aqueous solution. An acidic aluminum salt aqueous solution was prepared by diluting 7.38 kg of an aqueous solution containing aluminum sulfate in an amount of 7 percent by mass on an $Al_2O_3$ concentration basis with 13 kg of ion-exchange water while a titanium mineral acid salt aqueous solution was prepared by dissolving 1.82 kg of 33 percent by mass on a $TiO_2$ concentration basis of titanium sulfate in 10 kg of ion-exchange water. These aqueous solutions were mixed and heated to a temperature of 60° C. thereby preparing a mixed aqueous solution. This mixed aqueous solution was added at a constant rate (addition time: 10 minutes) into the tank containing therein the basic aluminum salt aqueous solution using a roller pump until the pH was 7.2 thereby preparing Hydrate Slurry a containing silica, titania, and alumina.

The resulting Hydrate Slurry a was aged, stirring at a temperature of 60° C. for one hour, and then dewatered with a flatsheet filter and washed with 150 L of a 0.3 percent by mass ammonium aqueous solution. After washing, the resulting cake-like slurry was diluted with ion-exchange water so that the amount of the slurry was 10 percent by mass on an $Al_2O_3$ concentration basis and then adjusted in pH to 10.5 with 15 percent by mass of ammonium water. The slurry was transferred to an aging tank with a reflux condenser and aged, stirring at a temperature of 95° C. for 10 hours. The resulting slurry was dewatered and then concentrated and kneaded to have a certain moisture level with a double-armed kneader with a steam jacket. The resulting kneaded product was extruded into a cylindrical shape with a diameter of 1.8 mm with an extruder and dried at a temperature of 110° C. The dried extruded products were calcined at a temperature of 550° C. in an electric furnace for 3 hours thereby producing Support a. Support a contained silica in an amount of 3 percent by mass on a $SiO_2$ concentration basis, titania in an amount of 20 percent by mass on a $TiO_2$ concentration basis, and aluminum in an amount of 77 percent by mass on an $Al_2O_3$ concentration basis, all on the support basis.

Support a was subjected to X-ray diffraction analysis with an X-ray diffraction apparatus "RINT 2100" manufactured by Rigaku Corporation (the same is applied to the following examples). The results are set forth in FIG. 1. Least square fitting was applied to the resulting graph, followed by baseline correction so as to find the full width at half maximum of the peak ascribed to the anatase titania (101) planes indicated at 2θ=25.5°. The product of the full width at half maximum and the peak intensity from the baseline to the maximum peak was defined as an anatase titania diffraction peak area. The same procedures were carried out to find the full width at half maximum of the peak ascribed to the rutile titania (110) planes indicated at 2θ=27.5°, and the product of the full width at half maximum and the peak intensity from the baseline was defined as a rutile titania diffraction peak area. The total of the anatase titania diffraction peak area and rutile titania diffraction peak area was defined as a titania diffraction peak area. It is noted that no rutile titania peak was not detected in Support a. Furthermore, the full width at half maximum of the peak ascribed to the γ-alumina (400) planes indicated at 2θ=45.9° was also found, and the product of the full width at half maximum and the peak intensity from the baseline was defined as an alumina diffraction peak area. For Support a, the diffraction peak area indicating the crystal structures of the anatase titania and rutile titania was ⅛ of the diffraction peak area of the crystal structure ascribed to aluminum (titania diffraction peak area/alumina diffraction peak area=⅛, and the same is applied to the following).

Next, 306 g of molybdenum trioxide and 68 g of cobalt carbonate were suspended in 500 ml of ion-exchanged water, and then heated at a temperature of 95° C. for 5 hours, applying a suitable reflux treatment so that the volume is not decreased, followed by dissolving of 68 g of phosphoric acid in the suspension thereby preparing an impregnation solution. After 1000 g of Support a was impregnated with this impregnation solution by spray, it was dried at a temperature of 250° C. and calcined at a temperature of 550° C. in an electric furnace for one hour thereby producing Hydrodesulfurization Catalyst a (hereinafter also referred to as "Catalyst a" and the same is applied to the following examples). Catalyst a contained the following metal components, 22 percent by mass of $MoO_3$, 3 percent by mass of CoO, and 3 percent by mass of $P_2O_5$, all on the catalyst basis. Properties of Catalyst a are set forth in Table 1 below.

Example 2

Preparation of Hydrodesulfurization Catalyst b

This example is different from Example 1 in that Hydrate Slurry b was prepared by adding at a constant rate to (1) a basic aluminum salt aqueous solution prepared by diluting 8.49 kg of an aqueous solution containing 22 percent by mass on an $Al_2O_3$ concentration basis of sodium aluminate with 37 kg of ion-exchanged water and adding thereto, stirring 1.80 kg of a solution containing 5 percent by mass on an $SiO_2$ concentration basis of sodium silicate, followed by heating to a temperature of 60° C. (2) a mixed aqueous solution prepared by mixing an acidic aluminum salt aqueous solution prepared by diluting 10.62 kg of an aqueous solution containing 7 percent by mass on an $Al_2O_3$ concentration basis of aluminum sulfate with 19 kg of ion-exchanged water and a titanium mineral acid salt aqueous solution prepared by dissolving 0.91 kg of 33 percent by mass on a TiO$_2$ concentration basis of titanium sulfate in 5 kg of ion-exchanged water, until the pH was 7.2.

In the same manner as Example 1, Support b was prepared from Hydrate Slurry b. Support b contained silica in an amount of 3 percent by mass on an SiO$_2$ concentration basis, titanium in an amount of 10 percent by mass on a TiO$_2$ concentration basis, and aluminum in an amount of 87 percent by mass on an Al$_2$O$_3$ basis, all on the support basis.

As the result of X-ray diffraction analysis carried out as with Example 1 (not shown), no diffraction peak indicating the crystal structures of the anatase titania and rutile titania was detected, and the titania diffraction peak area/alumina diffraction peak area was less than ¼.

As with Example 1, Catalyst b was produced using Support b. Catalyst b contained 22 percent by mass of MoO$_3$, 3 percent by mass of CoO, and 3 percent by mass of P$_2$O$_5$, all on the catalyst basis. Properties of Catalyst b are set forth in Table 1 below.

Example 3

Preparation of Hydrodesulfurization Catalyst c

This example is different from Example 1 in that Hydrate Slurry c was prepared by adding at a constant rate to (1) a basic aluminum salt aqueous solution prepared by diluting 7.82 kg of an aqueous solution containing 22 percent by mass on an Al$_2$O$_3$ concentration basis of sodium aluminate with 44 kg of ion-exchanged water and adding thereto, stirring 1.80 kg of a solution containing 5 percent by mass on an SiO$_2$ concentration basis of sodium silicate, followed by heating to a temperature of 60° C. (2) a mixed aqueous solution prepared by mixing an acidic aluminum salt aqueous solution prepared by diluting 4.14 kg of an aqueous solution containing 7 percent by mass on an Al$_2$O$_3$ concentration basis of aluminum sulfate with 7 kg of ion-exchanged water and a titanium mineral acid salt aqueous solution prepared by dissolving 2.73 kg of 33 percent by mass on a TiO$_2$ concentration basis of titanium sulfate in 15 kg of ion-exchanged water, until the pH was 7.2.

In the same manner as Example 1, Support c was prepared from Hydrate Slurry c. Support c contained silica in an amount of 3 percent by mass on an SiO$_2$ concentration basis, titanium in an amount of 30 percent by mass on a TiO$_2$ concentration basis and aluminum in an amount of 67 percent by mass on an Al$_2$O$_3$ basis, all on the support basis.

As the result of X-ray diffraction analysis carried out as with Example 1 (not shown), the titania diffraction peak area/alumina diffraction peak area was 1/5.

As with Example 1, Catalyst c was produced using Support c. Catalyst c contained 22 percent by mass of MoO$_3$, 3 percent by mass of CoO, and 3 percent by mass of P$_2$O$_5$, all on the catalyst basis. Properties of Catalyst c are set forth in Table 1 below.

Comparative Example 1

Preparation of Hydrodesulfurization Catalyst d

This example is different from Example 1 in that Hydrate Slurry d was prepared by adding at a constant rate to (1) a basic aluminum salt aqueous solution prepared by diluting 8.82 kg of an aqueous solution containing 22 percent by mass on an Al$_2$O$_3$ concentration basis of sodium aluminate with 34 kg of ion-exchanged water and adding thereto, stirring 1.80 kg of a solution containing 5 percent by mass on an SiO$_2$ concentration basis of sodium silicate, followed by heating to a temperature of 60° C. (2) an acidic aluminum salt aqueous solution prepared by diluting 13.86 kg of an aqueous solution containing 7 percent by mass on an Al$_2$O$_3$ concentration basis of aluminum sulfate with 25 kg of ion-exchanged water, until the pH was 7.2.

In the same manner as Example 1, Support d was prepared from Hydrate Slurry d. Support d contained silica in an amount of 3 percent by mass on an SiO$_2$ concentration basis, titanium in an amount of 0 percent by mass on a TiO$_2$ concentration basis and aluminum in an amount of 97 percent by mass on an Al$_2$O$_3$ concentration basis, all on the support basis.

As the result of X-ray diffraction analysis carried out as with Example 1 (not shown), no diffraction peak indicating the crystal structures of the anatase titania and rutile titania was detected, and the titania diffraction peak area/alumina diffraction peak area was less than ¼.

As with Example 1, Catalyst d was produced using Support d. Catalyst d contained 22 percent by mass of MoO$_3$, 3 percent by mass of CoO, and 3 percent by mass of P$_2$O$_5$, all on the catalyst basis. Properties of Catalyst d are set forth in Table 1 below.

Comparative Example 2

Preparation of Hydrodesulfurization Catalyst e

This example is different from Example 1 in that Hydrate Slurry e was prepared by adding at a constant rate to (1) a basic aluminum salt aqueous solution prepared by diluting 7.09 kg of an aqueous solution containing 22 percent by mass on an Al$_2$O$_3$ concentration basis of sodium aluminate with 47 kg of ion-exchanged water and adding thereto, stirring 1.80 kg of a solution containing 5 percent by mass on an SiO$_2$ concentration basis of sodium silicate, followed by heating to a temperature of 60° C. (2) a titanium mineral acid salt aqueous solution prepared by dissolving 4.09 kg of 33 percent by mass on a TiO$_2$ concentration basis of titanium sulfate in 23 kg of ion-exchange water, until the pH was 7.2.

In the same manner as Example 1, Support e was prepared from Hydrate Slurry e. Support e contained silica in an amount of 3 percent by mass on an SiO$_2$ concentration basis, titanium in an amount of 45 percent by mass on a TiO$_2$ concentration basis and aluminum in an amount of 52 percent by mass on an Al$_2$O$_3$ concentration basis, all on the support basis.

As the result of X-ray diffraction analysis carried out as with Example 1 (not shown), the titania diffraction peak area/alumina diffraction peak area was 1/3.

As with Example 1, Catalyst e was produced using Support e. Catalyst e contained 22 percent by mass of MoO$_3$, 3 percent by mass of CoO, and 3 percent by mass of P$_2$O$_5$, all on the catalyst basis. Properties of Catalyst e are set forth in Table 1 below.

Example 4

Preparation of Hydrodesulfurization Catalyst f

This example is different from Example 1 in that Hydrate Slurry f was prepared by adding at a constant rate to (1) a basic aluminum salt aqueous solution prepared by diluting 7.79 kg of an aqueous solution containing 22 percent by mass on an Al$_2$O$_3$ concentration basis of sodium aluminate with 40 kg of ion-exchanged water and adding thereto, stirring 4.20 kg of a solution containing 5 percent by mass on an SiO₂ concentration basis of sodium silicate, followed by heating to a temperature of 60° C. (2) a mixed aqueous solution prepared by mixing an acidic aluminum salt aqueous solution prepared by diluting 6.81 kg of an aqueous solution containing 7 percent by mass on an Al₂O₃ concentration basis of aluminum sulfate with 12 kg ion-exchanged water and a titanium mineral acid salt aqueous solution prepared by dissolving 1.82 kg of 33 percent by mass on a TiO₂ concentration basis of titanium sulfate in 10 kg of ion-exchanged water, until the pH was 7.2.

In the same manner as Example 1, Support f was prepared from Hydrate Slurry f. Support f contained silica in an amount of 7 percent by mass on an SiO₂ concentration basis, titanium in an amount of 20 percent by mass on a TiO₂ concentration basis and aluminum in an amount of 73 percent by mass on an Al₂O₃ concentration basis, all on the support basis.

As the result of X-ray diffraction analysis carried out as with Example 1 (not shown), the titania diffraction peak area/alumina diffraction peak area was 1/8.

As with Example 1, Catalyst f was produced using Support f. Catalyst f contained 22 percent by mass of MoO₃, 3 percent by mass of CoO, and 3 percent by mass of P₂O₅, all on the catalyst basis. Properties of Catalyst f are set forth in Table 2 below.

Example 5

Preparation of Hydrodesulfurization Catalyst g

This example is different from Example 1 in that Hydrate Slurry g was prepared by adding at a constant rate to (1) a basic aluminum salt aqueous solution prepared by diluting 7.52 kg of an aqueous solution containing 22 percent by mass on an Al₂O₃ concentration basis of sodium aluminate with 40 kg of ion-exchanged water and adding thereto, stirring 6.00 kg of a solution containing 5 percent by mass on an SiO₂ concentration basis of sodium silicate, followed by heating to a temperature of 60° C. (2) a mixed aqueous solution prepared by mixing an acidic aluminum salt aqueous solution prepared by diluting 6.38 kg of an aqueous solution containing 7 percent by mass on an Al₂O₃ concentration basis of aluminum sulfate with 11 kg of ion-exchanged water and a titanium mineral acid salt aqueous solution prepared by dissolving 1.82 kg of 33 percent by mass on a TiO₂ concentration basis of titanium sulfate in 10 kg of ion-exchanged water, until the pH was 7.2.

In the same manner as Example 1, Support g was prepared from Hydrate Slurry g. Support g contained silica in an amount of 10 percent by mass on an SiO₂ concentration basis, titanium in an amount of 20 percent by mass on a TiO₂ concentration basis and aluminum in an amount of 70 percent by mass on an Al₂O₃ concentration basis, all on the support basis.

As the result of X-ray diffraction analysis carried out as with Example 1 (not shown), the titania diffraction peak area/alumina diffraction peak area was 1/8.

As with Example 1, Catalyst g was produced using Support g. Catalyst g contained 22 percent by mass of MoO₃, 3 percent by mass of CoO, and 3 percent by mass of P₂O₅, all on the catalyst basis. Properties of Catalyst g are set forth in Table 2 below.

Comparative Example 3

Preparation of Hydrodesulfurization Catalyst h

This example is different from Example 1 in that Hydrate Slurry h was prepared by adding at a constant rate to (1) a basic aluminum salt aqueous solution prepared by diluting 8.43 kg of an aqueous solution containing 22 percent by mass on an Al₂O₃ concentration basis of sodium aluminate with 41 kg of ion-exchanged water, followed by heating to a temperature of 60° C. (2) a mixed aqueous solution prepared by mixing an acidic aluminum salt aqueous solution prepared by diluting 7.81 kg of an aqueous solution containing 7 percent by mass on an Al₂O₃ concentration basis of aluminum sulfate with 14 kg of ion-exchanged water and a titanium mineral acid salt aqueous solution prepared by dissolving 1.82 kg of 33 percent by mass on a TiO₂ concentration basis of titanium sulfate in 10 kg of ion-exchanged water, until the pH was 7.2.

In the same manner as Example 1, Support h was prepared from Hydrate Slurry h. Support h contained silica in an amount of 0 percent by mass on an SiO₂ concentration basis, titanium in an amount of 20 percent by mass on a TiO₂ concentration basis and aluminum in an amount of 80 percent by mass on an Al₂O₃ concentration basis, all on the support basis.

As the result of X-ray diffraction analysis carried out as with Example 1 (not shown), the titania diffraction peak area/alumina diffraction peak area was 1/4.

As with Example 1, Catalyst h was produced using Support h. Catalyst h contained 22 percent by mass of MoO₃, 3 percent by mass of CoO, and 3 percent by mass of P₂O₅, all on the basis of the catalyst. Properties of Catalyst h are set forth in Table 2 below.

Comparative Example 4

Preparation of Hydrodesulfurization Catalyst i

This example is different from Example 1 in that Hydrate Slurry i was prepared by adding at a constant rate to (1) a basic aluminum salt aqueous solution prepared by diluting 7.07 kg of an aqueous solution containing 22 percent by mass on an Al₂O₃ concentration basis of sodium aluminate with 40 kg of ion-exchanged water and adding thereto, stirring 9.00 kg of a solution containing 5 percent by mass on an SiO₂ concentration basis of sodium silicate, followed by heating to a temperature of 60° C. (2) a mixed aqueous solution prepared by mixing an acidic aluminum salt aqueous solution prepared by diluting 5.67 kg of an aqueous solution containing 7 percent by mass on an Al₂O₃ concentration basis of aluminum sulfate with 10 kg of ion-exchanged water and a titanium mineral acid salt aqueous solution prepared by dissolving 1.82 kg of 33 percent by mass on a TiO₂ concentration basis of titanium sulfate in 10 kg of ion-exchanged water, until the pH was 7.2.

In the same manner as Example 1, Support i was prepared from Hydrate Slurry i. Support i contained silica in an amount of 15 percent by mass on an SiO₂ concentration basis, titanium in an amount of 20 percent by mass on a TiO₂ concentration basis and aluminum in an amount of 65 percent by mass on an Al₂O₃ concentration basis, all on the support basis.

As the result of X-ray diffraction analysis carried out as with Example 1 (not shown), the titania diffraction peak area/alumina diffraction peak area was 1/8.

As with Example 1, Catalyst i was produced using Support i Catalyst i contained 22 percent by mass of MoO₃, 3 percent by mass of CoO, and 3 percent by mass of P₂O₅, all on the catalyst basis. Properties of Catalyst i are set forth in Table 2 below.

Example 6

Preparation of Hydrodesulfurization Catalyst j

Support a produced in Example 1 was used as a support.
Next, 278 g of molybdenum trioxide and 114 g of cobalt carbonate were suspended in 500 ml of ion-exchanged water, and then heated at a temperature of 95° C. for 5 hours, applying thereto a suitable reflux treatment so that the volume is not decreased, followed by dissolving therein 68 g of phosphoric acid and 76 g of nitric acid thereby preparing an impregnation solution. After 1000 g of Support a was impregnated with this impregnation solution by spray, it was dried at a temperature of 250° C. and calcined at a temperature of 550° C. in an electric furnace for one hour thereby producing Hydrodesulfurization Catalyst j. Catalyst j contained 20 percent by mass of $MoO_3$, 5 percent by mass of CoO, and 3 percent by mass of $P_2O_5$, all on the catalyst basis. Properties of Catalyst j are set forth in Table 3 below.

Example 7

Preparation of Hydrodesulfurization Catalyst k

Support a produced in Example 1 was used as a support.
Next, 278 g of molybdenum trioxide and 114 g of cobalt carbonate were suspended in 500 ml of ion-exchanged water, and then heated at a temperature of 95° C. for 5 hours, applying thereto a suitable reflux treatment so that the volume is not decreased, followed by dissolving therein 68 g of phosphoric acid and 174 g of malic acid thereby preparing an impregnation solution. After 1000 g of Support a was impregnated with this impregnation solution by spray, it was dried at a temperature of 250° C. and calcined at a temperature of 550° C. in an electric furnace for one hour thereby producing Hydrodesulfurization Catalyst k. Catalyst k contained 20 percent by mass of $MoO_3$, 5 percent by mass of CoO, and 3 percent by mass of $P_2O_5$, all on the catalyst basis. Properties of Catalyst k are set forth in Table 3 below.

Example 8

Preparation of Hydrodesulfurization Catalyst 1

Support a produced in Example 1 was used as a support.
Next, 267 g of molybdenum trioxide and 109 g of cobalt carbonate were suspended in 500 ml of ion-exchanged water, and then heated at a temperature of 95° C. for 5 hours, applying thereto a suitable reflux treatment so that the volume was not decreased, followed by dissolving therein 167 g of malic acid thereby preparing an impregnation solution. After 1000 g of Support a was impregnated with this impregnation solution by spray, it was dried at a temperature of 250° C. and calcined at a temperature of 550° C. in an electric furnace for one hour thereby producing Hydrodesulfurization Catalyst 1. Catalyst 1 contained 20 percent by mass of $MoO_3$, 5 percent by mass of CoO, and 0 percent by mass of $P_2O_5$, all on the catalyst basis. Properties of Catalyst 1 are set forth in Table 3 below.

Example 9

Preparation of Hydrodesulfurization Catalyst m

Support a produced in Example 1 was used as a support.
Next, 306 g of molybdenum trioxide and 76 g of nickel carbonate were suspended in 500 ml of ion-exchanged water, and then heated at a temperature of 95° C. for 5 hours, applying thereto a suitable reflux treatment so that the volume was not decreased, followed by addition and dissolve of 68 g of malic acid thereby preparing an impregnation solution. After 1000 g of Support a was impregnated with this impregnation solution by spray, it was dried at a temperature of 250° C. and calcined at a temperature of 550° C. in an electric furnace for one hour thereby producing Hydrodesulfurization Catalyst m. Catalyst m contained 22 percent by mass of $MoO_3$, 3 percent by mass of NiO, and 3 percent by mass of $P_2O_5$, all on the catalyst basis. Properties of Catalyst m are set forth in Table 3 below.

Example 10

Preparation of Hydrodesulfurization Catalyst n

This example is different from Example 1 in that Hydrate Slurry n was prepared by adding at a constant rate to (1) a mixed aqueous solution prepared by mixing an acidic aluminum salt aqueous solution prepared by diluting 7.17 kg of an aqueous solution containing 7 percent by mass on an $Al_2O_3$ concentration basis of aluminum sulfate with 13 kg of ion-exchanged water and a titanium mineral acid salt aqueous solution prepared by dissolving 1.82 kg of 33 percent by mass on a $TiO_2$ concentration basis of titanium sulfate in 10 kg of ion-exchanged water, and further 1.88 kg of a solution containing 4.8 percent by mass on a $SiO_2$ concentration basis of silicic acid (2) a basic aluminum salt aqueous solution prepared by diluting 8.22 kg of an aqueous solution containing 22 percent by mass on an $Al_2O_3$ concentration basis of sodium aluminate with 41 kg of ion-exchanged water, followed by heating to a temperature of 60° C., until the pH was 7.2.
In the same manner as Example 1, Support n was prepared from Hydrate Slurry n. Support n contained silica in an amount of 3 percent by mass on an $SiO_2$ concentration basis, titanium in an amount of 20 percent by mass on a $TiO_2$ concentration basis and aluminum in an amount of 77 percent by mass on an $Al_2O_3$ concentration basis, on the support basis. As the result of X-ray diffraction analysis was carried out as with Example 1 (not shown), the titania diffraction peak area/alumina diffraction peak area was 1/7.
As with Example 1, Catalyst n was produced using Support n. Catalyst n contained 22 percent by mass of $MoO_3$, 3 percent by mass of CoO, and 3 percent by mass of $P_2O_5$, all on the catalyst basis. Properties of Catalyst n are set forth in Table 3 below.

[Test 1]

Crude oil having the following properties was hydrotreated with a hydrodesulfurization unit manufactured by ZYTEL Co. using Catalysts a to n. A temperature at which the produced oil has a sulfur content of 7 ppm by mass (hereinafter referred to as "reaction temperature") is determined to compare the desulfurization performance among the catalysts. Hydrotreating reaction was carried out under the following conditions. The results are set forth in Tables 1 to 3.
[Properties of Crude Oil]
Feedstock: straight run gas oil
(boiling point range 208 to 390° C.)
Density at 15° C.: 0.8493 g/cm$^3$
Sulfur content: 1.32 percent by mass
Nitrogen content: 105 ppm by mass
[Reaction Conditions]
Liquid hourly space velocity: 1.0 hr$^{-1}$
Hydrogen pressure: 4.9 MPa
Hydrogen/oil ratio: 250 NL/L

TABLE 1

|  |  | Example 1 | Example 2 | Example 3 | Comparative Example 1 | Comparative Example 2 |
|---|---|---|---|---|---|---|
|  |  | Catalyst a | Catalyst b | Catalyst c | Catalyst d | Catalyst e |
| Support Components |  |  |  |  |  |  |
| silica | mass % | 3 | 3 | 3 | 3 | 3 |
| titania | mass % | 20 | 10 | 30 | 0 | 45 |
| alumina | mass % | 77 | 87 | 67 | 97 | 52 |
| Loaded Components |  |  |  |  |  |  |
| $MoO_3$ (catalyst basis) | mass % | 22 | 22 | 22 | 22 | 22 |
| $CoO$ (catalyst basis) | mass % | 3 | 3 | 3 | 3 | 3 |
| $P_2O_5$ (catalyst basis) | mass % | 3 | 3 | 3 | 3 | 3 |
| $P_2O_5$ (basis of 100 mass % of VIA metal) | mass % | 13.6 | 13.6 | 13.6 | 13.6 | 13.6 |
| Properties |  |  |  |  |  |  |
| $PV_o$ | ml/g | 0.43 | 0.45 | 0.4 | 0.47 | 0.26 |
| SA | m²/g | 203 | 212 | 181 | 228 | 132 |
| PD | Å | 75 | 75 | 75 | 75 | 105 |
| $PD_p/PV_o$ | % | 91 | 89 | 88 | 90 | 78 |
| Desulfurization Performance |  |  |  |  |  |  |
| Reaction Temperature | ° C. | 342 | 347 | 342 | 363 | 365 |

TABLE 2

|  |  | Example 1 | Example 4 | Example 5 | Comparative Example 3 | Comparative Example 4 |
|---|---|---|---|---|---|---|
|  |  | Catalyst a | Catalyst f | Catalyst g | Catalyst h | Catalyst i |
| Support Components |  |  |  |  |  |  |
| silica | mass % | 3 | 7 | 10 | 0 | 15 |
| titania | mass % | 20 | 20 | 20 | 20 | 20 |
| alumina | mass % | 77 | 73 | 70 | 80 | 65 |
| Loaded Components |  |  |  |  |  |  |
| $MoO_3$ (catalyst basis) | mass % | 22 | 22 | 22 | 22 | 22 |
| $CoO$ (catalyst basis) | mass % | 3 | 3 | 3 | 3 | 3 |
| $P_2O_5$ (catalyst basis) | mass % | 3 | 3 | 3 | 3 | 3 |
| $P_2O_5$ (basis of 100 mass % of VIA metal) | mass % | 13.6 | 13.6 | 13.6 | 13.6 | 13.6 |
| Properties |  |  |  |  |  |  |
| $PV_o$ | ml/g | 0.43 | 0.51 | 0.53 | 0.42 | 0.57 |
| SA | m²/g | 203 | 221 | 233 | 171 | 235 |
| PD | Å | 75 | 90 | 95 | 90 | 95 |
| $PD_p/PV_o$ | % | 91 | 82 | 76 | 89 | 62 |
| Desulfurization Performance |  |  |  |  |  |  |
| Reaction Temperature | ° C. | 342 | 350 | 352 | 361 | 354 |

TABLE 3

|  |  | Example 6 | Example 7 | Example 8 | Example 9 | Example 10 |
|---|---|---|---|---|---|---|
|  |  | Catalyst j (Support a) | Catalyst k (Support a) | Catalyst l (Support a) | Catalyst m (Support a) | Catalyst n (Support n) |
| Support Components |  |  |  |  |  |  |
| silica | mass % | 3 | 3 | 3 | 3 | 3 |
| titania | mass % | 20 | 20 | 20 | 20 | 20 |
| alumina | mass % | 77 | 77 | 77 | 77 | 77 |
| Loaded Components |  |  |  |  |  |  |
| $MoO_3$ (catalyst basis) | mass % | 20 | 20 | 20 | 22 | 22 |
| NiO (catalyst basis) | mass % | 0 | 0 | 0 | 3 | 0 |

TABLE 3-continued

|  |  | Example 6 | Example 7 | Example 8 | Example 9 | Example 10 |
|---|---|---|---|---|---|---|
|  |  |  |  | Catalyst |  |  |
|  |  | Catalyst j (Support a) | Catalyst k (Support a) | Catalyst l (Support a) | Catalyst m (Support a) | Catalyst n (Support n) |
| $C_0O$ (catalyst basis) | mass % | 5 | 5 | 5 | 0 | 3 |
| $P_2O_5$ (catalyst basis) | mass % | 3 | 3 | 0 | 3 | 3 |
| $P_2O_5$ (basis of 100 mass % of VIA metal) | mass % | 15.0 | 15.0 | 0 | 13.6 | 13.6 |
| Organic Acid/Inorganic acid (excluding phosphoric acid) |  | nitric acid | malic acid | malic acid | none | none |
| Properties |  |  |  |  |  |  |
| $PV_o$ | ml/g | 0.43 | 0.43 | 0.44 | 0.43 | 0.47 |
| SA | m²/g | 201 | 204 | 209 | 204 | 219 |
| PD | Å | 75 | 75 | 75 | 75 | 95 |
| $PD_p/PV_o$ | % | 91 | 91 | 91 | 91 | 82 |
| Desulfurization Performance |  |  |  |  |  |  |
| Reaction Temperature | ° C. | 343 | 343 | 344 | 344 | 347 |

Table 1 sets forth the results of influences of the varied amounts of titania in the support. An increase in the titania amount in the support enhances the desulfurization performance. However, when the amount was in excess of 40 percent, the performance was deteriorated due to the poor sharpness of the pore distribution. Table 2 sets forth the results of influences of the varied amounts of silica in the support. When the silica amount in the support was in excess of 10 percent, the performance was deteriorated due to the poor sharpness of the pore distribution. Table 3 sets forth the results of influences of variations in metal components to be supported. Both nickel-molybdenum and cobalt-molybdenum exhibited an excellent desulfurization performance. The results showed that the catalysts comprising metal components together with phosphoric acid and/or an organic acid had an excellent desulfurization performance. For the support production, both the method wherein an acid solution was added to a basic solution and the method wherein a basic solution was added to an acid solution provide successfully catalysts having an excellent desulfurization performance.

From the above results, the catalysts of the present invention were found to be low in a temperature at which the sulfur content of the produced oil was 7 ppm by mass and to be excellent in desulfurization activity. The support used in the present invention comprises inexpensive alumina as the main component and thus does not increase significantly the production cost, compared with conventional alumina- or alumina-silica-based catalysts. The catalyst of the present invention is inexpensive and excellent in performances.

Example 11

A reaction tube (inner diameter of 20 mm) filled with catalyst a (100 ml) was installed in a fixed bed flow type hydrodesulfurization unit. Thereafter, Catalyst a was pre-sulfurized for 48 hours using a straight-run gas oil containing dimethyl disulfide, so that the sulfur content was 1.5 percent by mass, under conditions where the catalyst layer average temperature was 350° C., the hydrogen partial pressure was 5.0 MPa, the liquid hourly space velocity was 1.0 h⁻¹, and the hydrogen/oil ratio was 200 NL/L.

After pre-sulfurization, a straight run gas oil from the Middle East (properties thereof set forth in Table 4 below) was run through the catalyst under a hydrogen atmosphere for hydrotreatment under conditions where the reaction temperature was 350° C., the hydrogen partial pressure was 5.0 MPa, the liquid hourly space velocity was 1.0 h⁻¹, and the hydrogen/oil ratio was 200 NL/L. The hydrotreatment conditions and properties of the produced oil are set forth in Table 5.

Example 12

As with Example 11 except that the reaction temperature was 335° C., a straight-run gas oil from the Middle East (properties thereof set forth in Table 4 below) was hydrotreated. The hydrotreatment conditions and properties of the produced oil are set forth in Table 5.

Example 13

As with Example 11 except that the hydrogen partial pressure was 4.0 MPa, a straight-run gas oil from the Middle East (properties thereof set forth in Table 4 below) was hydrotreated. The hydrotreatment conditions and properties of the produced oil are set forth in Table 5.

Example 14

As with Example 11 except for using Catalyst c in place of Catalyst a, a straight-run gas oil from the Middle East (properties thereof set forth in Table 4 below) was hydrotreated. The hydrotreatment conditions and properties of the produced oil are set forth in Table 5.

Example 15

As with Example 11 except for using a light cycle oil (properties thereof set forth in Table 4 below) in place of the Middle East straight-run gas oil, the gas oil was hydrotreated. The hydrotreatment conditions and properties of the produced oil are set forth in Table 5.

Comparative Example 5

A reaction tube (inner diameter of 20 mm) filled with catalyst e (100 ml) was installed in a fixed bed flow type hydrodesulfurization unit. Thereafter, Catalyst e was pre-sulfurized for 48 hours using a straight-run gas oil containing dimethyl disulfide, so that the sulfur content was 1.5 percent by mass, under conditions where the catalyst layer average temperature was 350° C., the hydrogen partial pressure was 5.0 MPa, the liquid hourly space velocity was 1.0 h$^{-1}$, and the hydrogen/oil ratio was 200 NL/L.

After pre-sulfurization, a straight-run gas oil from the Middle East (properties thereof set forth in Table 4 below) was run through the catalyst under a hydrogen atmosphere for hydrotreatment under conditions where the reaction temperature was 350° C., the hydrogen partial pressure was 5.0 MPa, the liquid hourly space velocity was 1.0 h$^{-1}$, and the hydrogen/oil ratio was 200 NL/L. The hydrotreatment conditions and properties of the produced oil are set forth in Table 5.

TABLE 4

| Properties of Hydrocarbon Oil | | Analysis Method | Hydrocarbon Oil | |
|---|---|---|---|---|
| | | | Middle East Straight Run Gas Oil | Light Cycle Oil |
| Ratio of fraction of 260 to 360° C. boiling poin | vol % | JIS K2254 | 80 | 85 |
| 10% distillation tamperature | ° C. | | 270.0 | 264.0 |
| 90% distillation tamperature | ° C. | | 345.0 | 347.0 |
| Density @15° C. | g/m$^3$ | JIS K2249 | 0.8493 | 0.8854 |
| Sulfur Content | mass % | JIS K2541 | 1.32 | 0.3 |
| Nitorogen Content | mass ppm | JIS K2609 | 105 | 110 |

TABLE 5

| | | Example 11 | Example 12 | Example 13 | Example 14 | Example 15 | Comparative Example 5 |
|---|---|---|---|---|---|---|---|
| Hydrocarbon Oil | | Middle East Straight-Run Gas Oil | Middle East Straight-Run Gas Oil | Middle East Straight-Run Gas Oil | Middle East Straight-Run Gas Oil | Light Cycle Oil | Middle East Straight-Run Gas Oil |
| Catalyst | | Catalyst a | Catalyst a | Catalyst a | Catalyst c | Catalyst a | Catalyst e |
| Reaction Temperature | ° C. | 350 | 335 | 350 | 350 | 350 | 350 |
| Hydrogen Partial Pressure | Mpa | 5.0 | 5.0 | 4.0 | 5.0 | 5.0 | 5.0 |
| Liquid Hourly Space Velocity | h$^{-1}$ | 1.0 | 1.0 | 1.0 | 1.0 | 1.0 | 1.0 |
| Hydrogen/Oil Ratio | NL/L | 200 | 200 | 200 | 200 | 200 | 200 |
| Sulfer Content | mass ppm | 4 | 10 | 8 | 6 | 10 | 85 |
| Nitrogen Content | mass ppm | 1 | 2 | 3 | 1 | 2 | 10 |

Examples 11 to 15 satisfying the requirements of the method for hydrorefining a hydrocarbon oil of the present invention are confirmed to be able to decrease sulfur and nitrogen contents at a higher level and be excellent in desulfurization activity.

INDUSTRIAL APPLICABILITY

The hydrodesulfurization catalyst of the present invention has higher desulfurization activity in particular for hydrotreatment of gas oil fractions and thus are extremely used for industrial purposes.

The invention claimed is:

1. A hydrodesulfurization catalyst for a hydrocarbon oil comprising at least one type of metal component selected from Groups VIA and VIII in the periodic table, supported on a silica-titania-alumina support where the total of the diffraction peak area indicating the crystal structure of anatase titania (101) planes and the diffraction peak area indicating the crystal structure of rutile titania (110) planes is ¼ or less of the diffraction peak area indicating the aluminum crystal structure ascribed to γ-alumina (400) planes, as measured by X-ray diffraction analysis, the catalyst having (a) a specific surface area (SA) of 150 m$^2$/g or greater, (b) a total pore volume (PVo) of 0.30 ml/g or greater, (c) an average pore diameter (PD) of 6 to 15 nm (60 to 150 Å), and (d) the ratio of the pore volume (PVp) of pores having diameters within ±30 percent of the average pore diameter (PD) being 70 percent or greater of the total pore volume (PVo),
wherein said silica-titania-alumina support contains silica in the form of SiO$_2$ in an amount of 1 to 10 percent by mass, titania in the form of TiO$_2$ in an amount of 15 to 35 percent by mass, and alumina in the form of Al$_2$O$_3$ in an amount of 55 to 84 percent by mass, all on the support basis.

2. The hydrodesulfurization catalyst for a hydrocarbon oil according to claim 1, wherein said metal component selected from Groups VIA and VIII in the periodic table is selected from the group consisting of molybdenum, tungsten, cobalt, and nickel.

3. The hydrodesulfurization catalyst for a hydrocarbon oil according to claim 1, wherein said metal component selected from Groups VIA and VIII in the periodic table is supported in an amount of 1 to 35 percent by mass in the form of oxide on the catalyst basis.

4. The hydrodesulfurization catalyst for a hydrocarbon oil according to claim 1, wherein the total of the diffraction peak area indicating the crystal structure of anatase titania (101) planes and the diffraction peak area indicating the crystal structure of rutile titania (110) planes is less than ⅕ of the diffraction peak area indicating the aluminum crystal structure ascribed to γ-alumina (400) planes.

5. A method for hydrorefining a hydrocarbon oil wherein a hydrocarbon oil is hydrotreated under a hydrogen atmosphere using the hydrodesulfurization catalyst according to claim 1.

6. The method for hydrorefining a hydrocarbon oil according to claim 5, wherein said hydrotreatment is carried out at a reaction temperature of 300 to 420° C., a hydrogen partial pressure of 3.0 to 15.0 MPa, a liquid hourly space velocity of 0.5 to 4.0 h$^{-1}$, and a hydrogen/oil ratio of 120 to 420 NL/L.

7. The method for hydrorefining a hydrocarbon oil according to claim 5, wherein said hydrocarbon oil is selected from the group consisting of straight-run gas oil, vacuum gas oil, light cycle oil, hydrocracked gas oil, and thermal cracked gas oil.

8. The method for hydrorefining a hydrocarbon oil according to claim 5, wherein said hydrocarbon oil contains 70 percent by volume or more of a fraction having a boiling point of 260 to 360° C.

9. The method for hydrorefining a hydrocarbon oil according to claim 5, wherein an oil produced by hydrotreatment of said hydrocarbon oil contains sulfur in an amount of 10 ppm by mass or less and nitrogen in an amount of 3 ppm by mass or less.

* * * * *